United States Patent
Kang

(10) Patent No.: US 11,186,223 B2
(45) Date of Patent: Nov. 30, 2021

(54) LARGE VEHICLE APPROACH WARNING DEVICE AND METHOD FOR CONTROLLING THE SAME

(71) Applicant: MANDO CORPORATION, Pyeongtaek-si (KR)

(72) Inventor: Boryeon Kang, Seongnam-si (KR)

(73) Assignee: Mando Corporation, Pyeongtaek-si (KR)

(*) Notice: Subject to any disclaimer, the term of this patent is extended or adjusted under 35 U.S.C. 154(b) by 149 days.

(21) Appl. No.: 16/595,806

(22) Filed: Oct. 8, 2019

(65) Prior Publication Data
US 2020/0108771 A1 Apr. 9, 2020

(30) Foreign Application Priority Data
Oct. 8, 2018 (KR) .................. 10-2018-0120093

(51) Int. Cl.
| | | |
|---|---|---|
| *G06K 9/00* | (2006.01) | |
| *G06F 7/70* | (2006.01) | |
| *B60Q 9/00* | (2006.01) | |
| *G06T 7/20* | (2017.01) | |
| *G06T 7/62* | (2017.01) | |
| *G01S 19/13* | (2010.01) | |
| *G01S 13/931* | (2020.01) | |

(52) U.S. Cl.
CPC .................. *B60Q 9/00* (2013.01); *G06T 7/20* (2013.01); *G06T 7/62* (2017.01); *G01S 13/931* (2013.01); *G01S 19/13* (2013.01); *G01S 2013/9323* (2020.01); *G01S 2013/9324* (2020.01); *G06T 2207/30236* (2013.01); *G06T 2207/30252* (2013.01)

(58) Field of Classification Search
USPC ....... 382/100, 103, 106–107, 104, 154, 162, 382/172, 173, 181, 189, 199, 209, 382/219–220, 232, 254, 276; 1/1; 701/117
See application file for complete search history.

(56) References Cited

U.S. PATENT DOCUMENTS

| | | | | |
|---|---|---|---|---|
| 9,796,422 | B2* | 10/2017 | Takahashi | B60W 30/12 |
| 10,427,655 | B2* | 10/2019 | Nix | G06K 9/00791 |
| 2016/0280264 | A1* | 9/2016 | Baek | G06K 9/00818 |
| 2017/0291601 | A1* | 10/2017 | Kim | B60W 30/06 |
| 2017/0305349 | A1* | 10/2017 | Naboulsi | B60R 1/025 |
| 2018/0022277 | A1* | 1/2018 | Tayama | B60W 50/16 701/117 |

FOREIGN PATENT DOCUMENTS

| | | |
|---|---|---|
| JP | 2013-28237 A | 2/2013 |
| KR | 10-2009-0130932 A | 12/2009 |
| KR | 10-2015-0051551 A | 5/2015 |
| KR | 10-2017-0068129 A | 6/2017 |

* cited by examiner

*Primary Examiner* — Seyed H Azarian
(74) *Attorney, Agent, or Firm* — Morgan, Lewis & Bockius LLP

(57) ABSTRACT

The present embodiments relate to a large vehicle approach warning device and a method for controlling the same for enabling the driver to cope with the instability of the vehicle due to a cross wind generated by a large vehicle approaching a host vehicle, by outputting an warning message when the driver is not griping the steering wheel in a situation where the vehicle is approaching the host vehicle at a high speed in the rear side.

16 Claims, 8 Drawing Sheets

[FIG. 1]
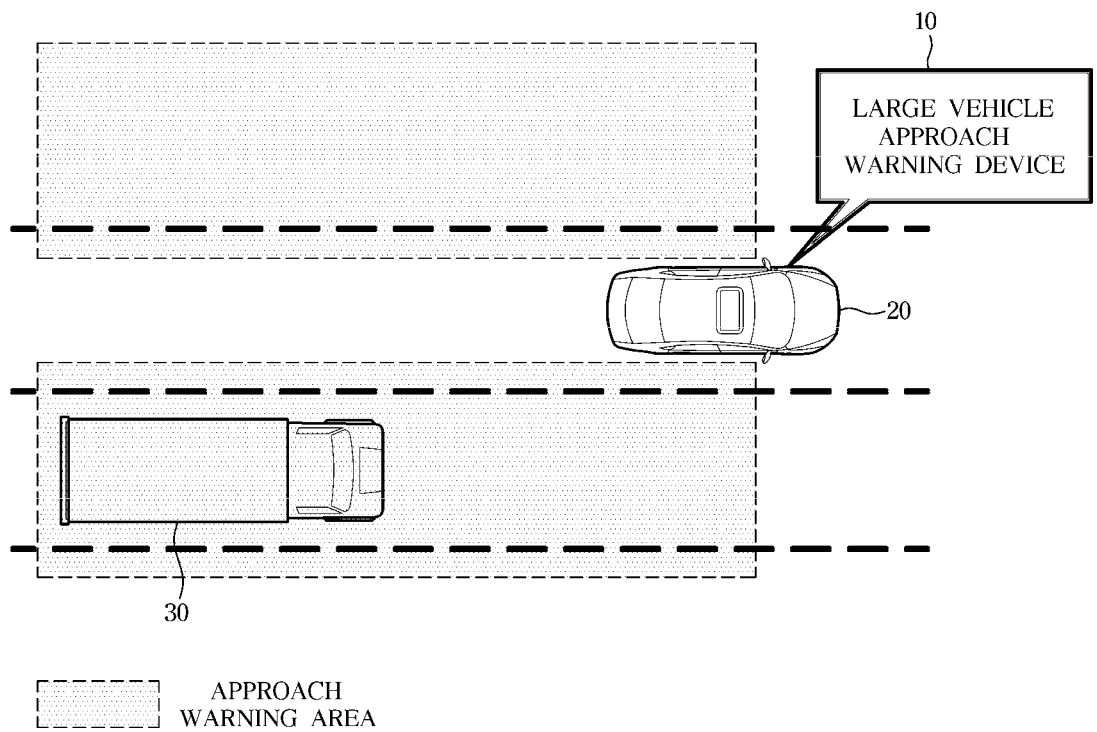

[FIG. 2]
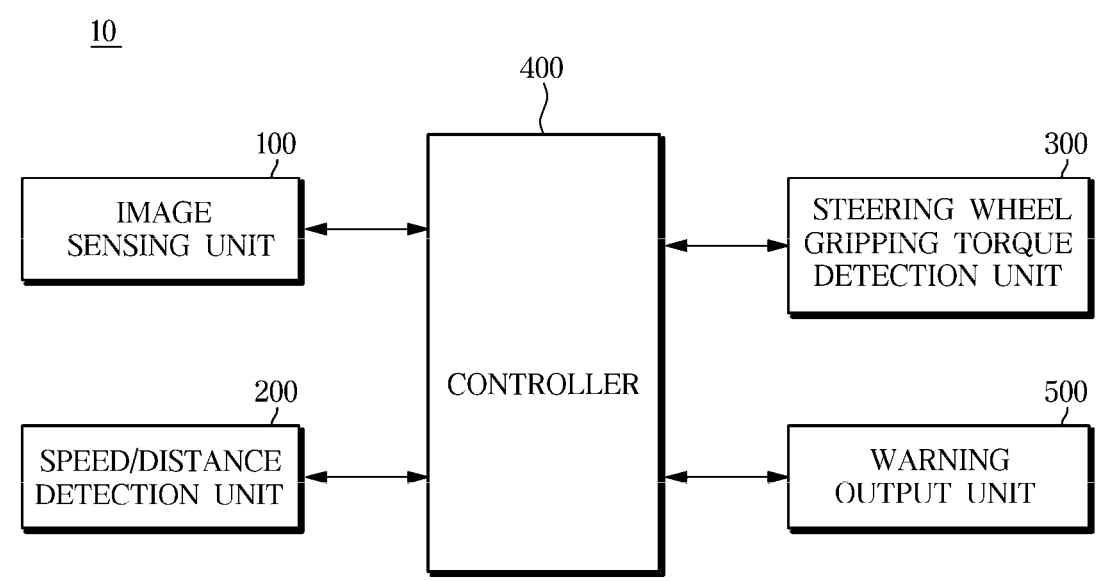

[FIG. 3]
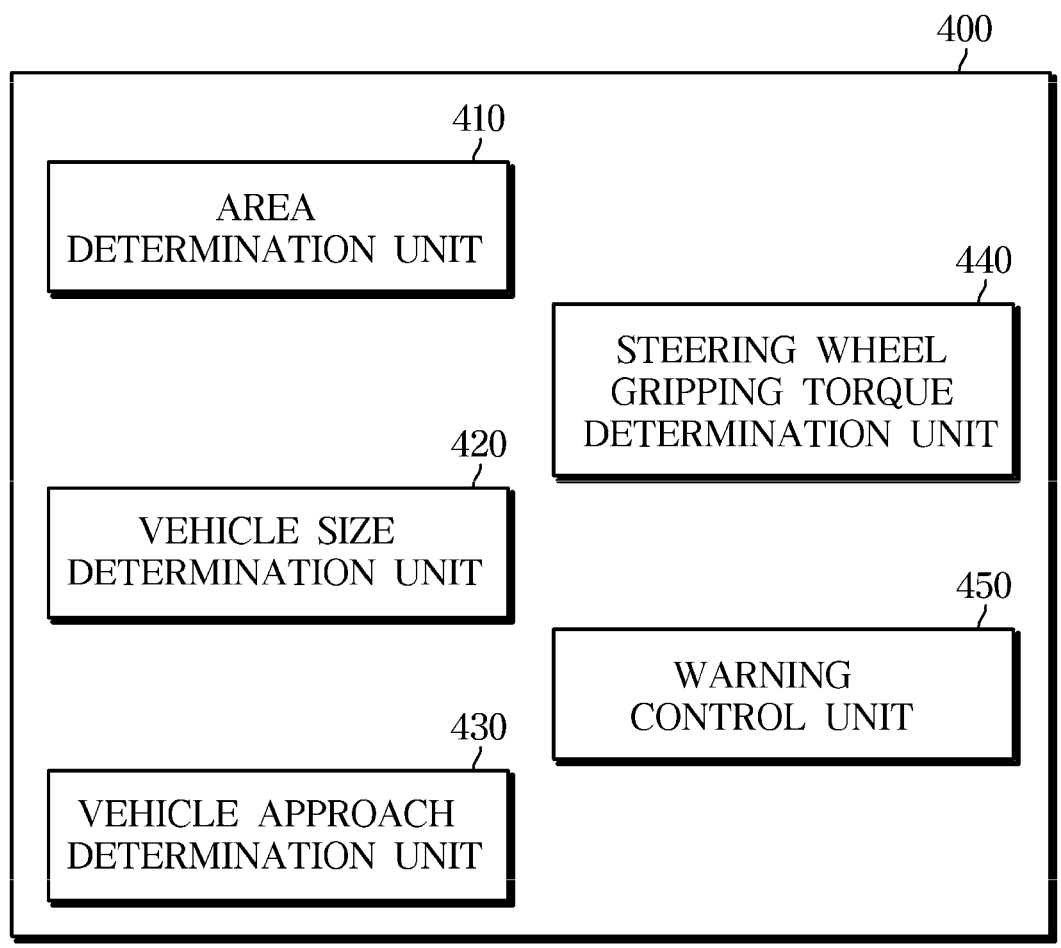

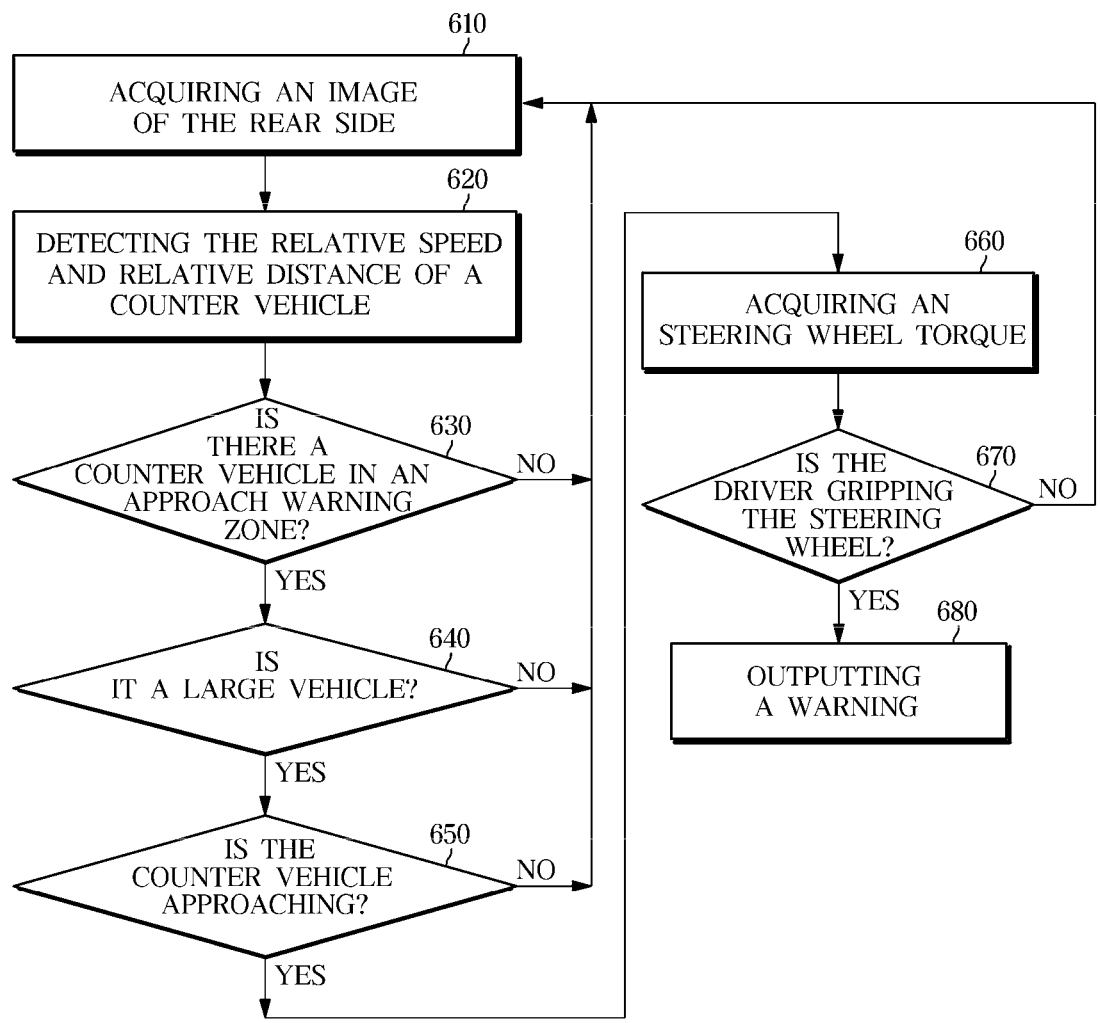

[FIG. 5]
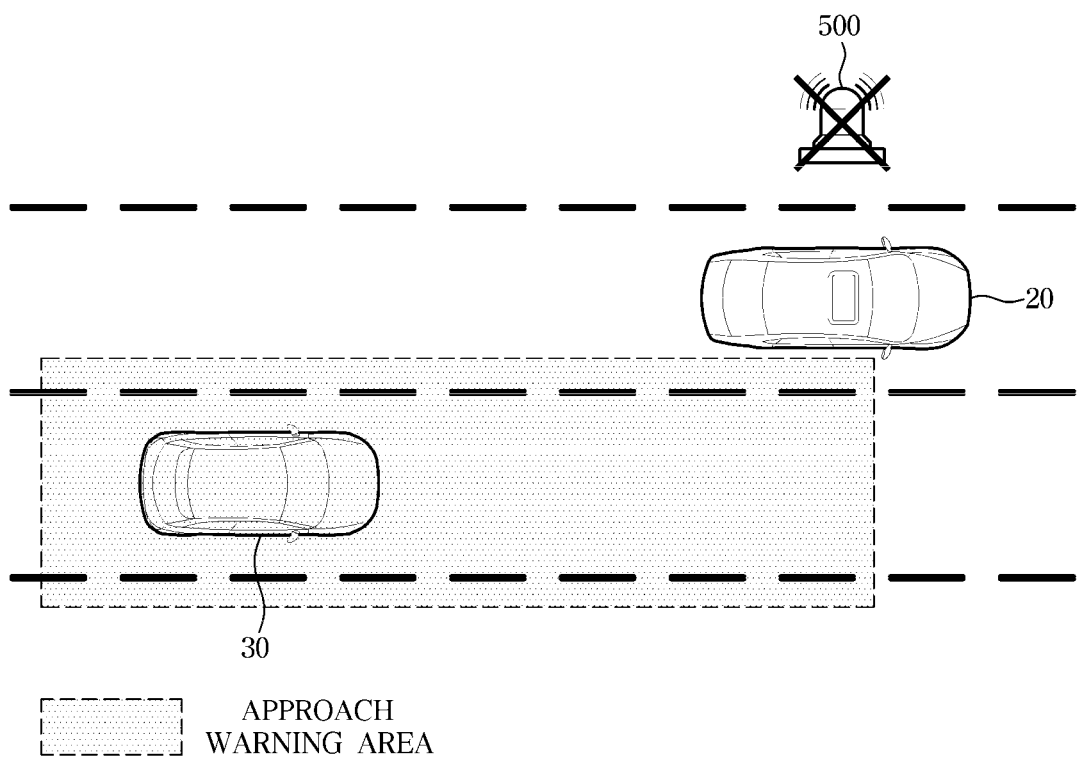

【FIG. 6】
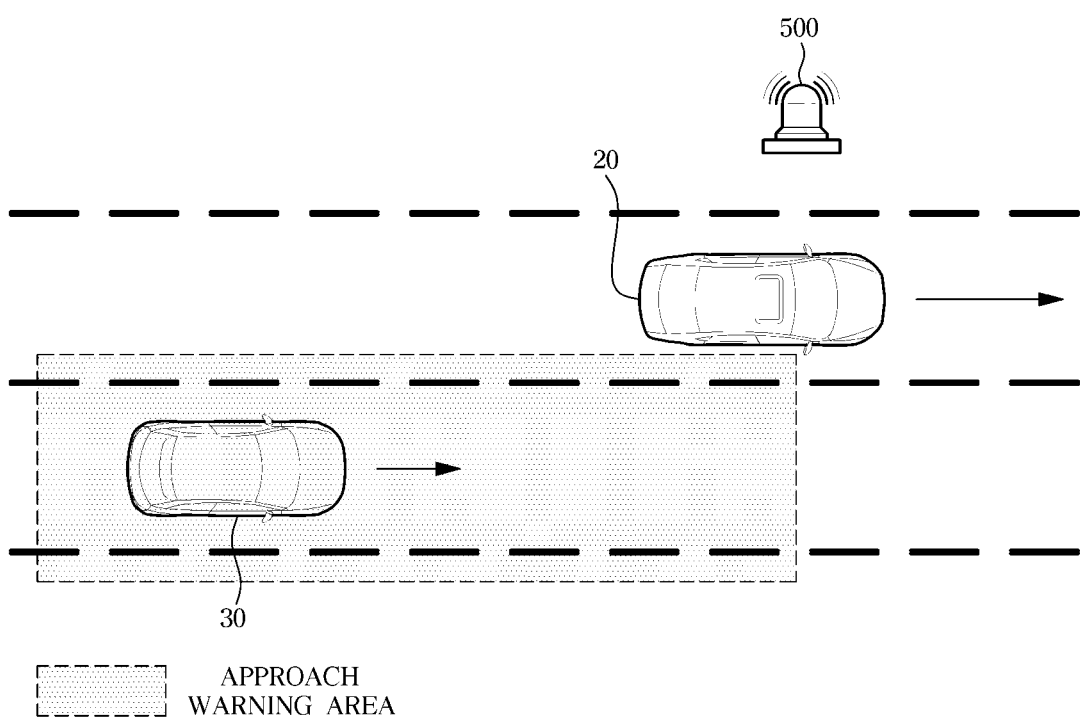

【FIG. 7】
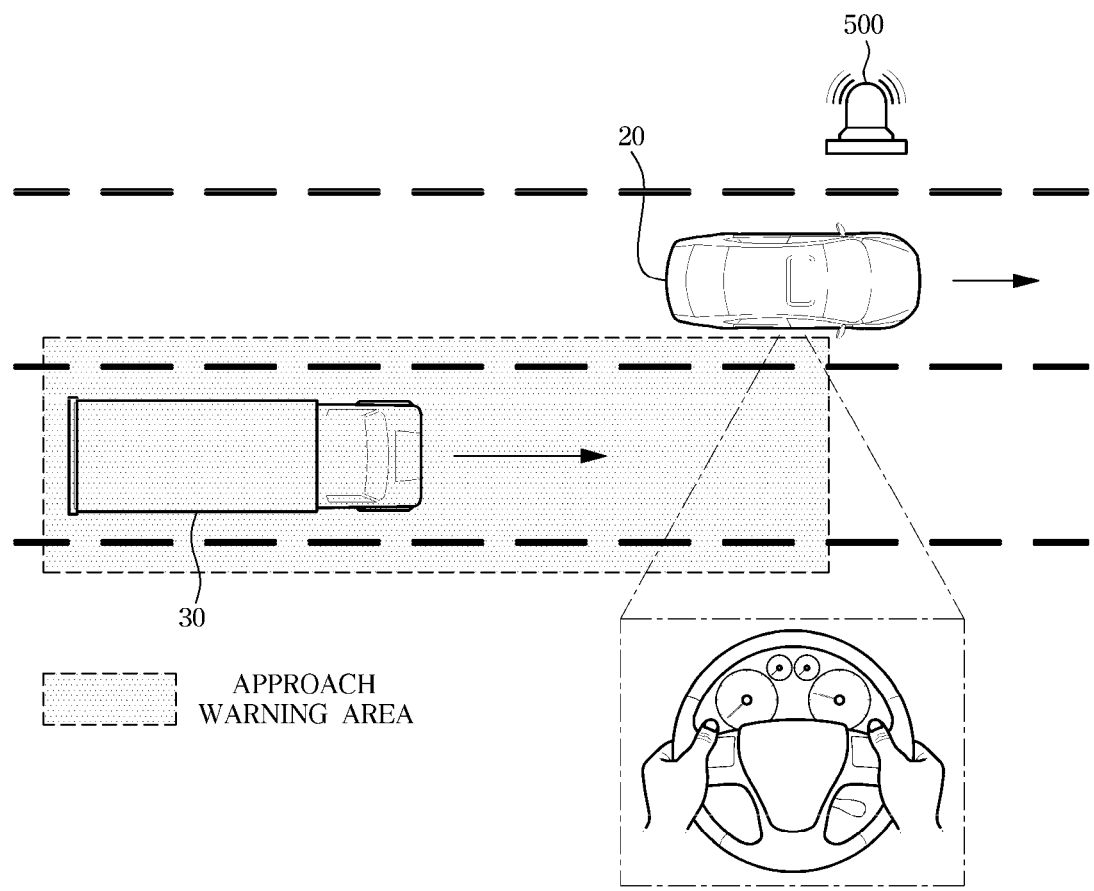

【FIG. 8】
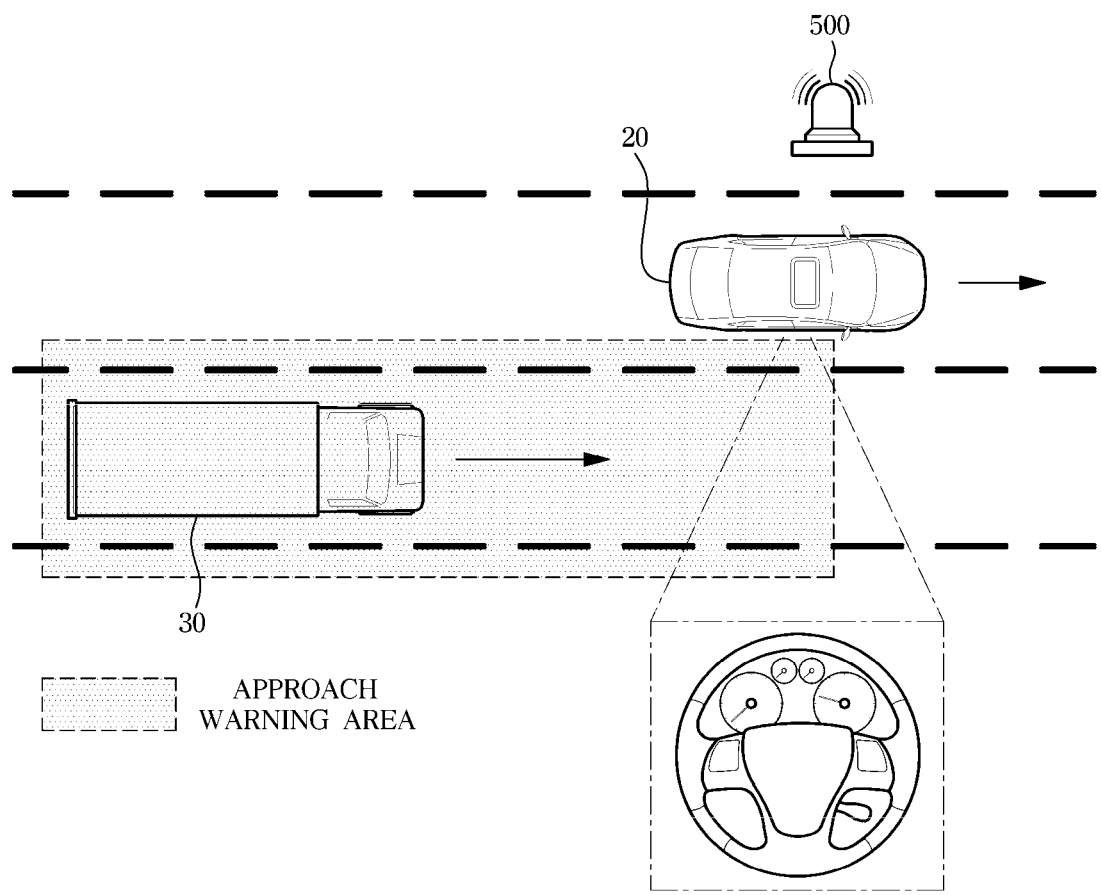

LARGE VEHICLE APPROACH WARNING DEVICE AND METHOD FOR CONTROLLING THE SAME

CROSS-REFERENCE TO RELATED APPLICATION

This application is based on and claims priority under 35 U.S.C. § 119 to Korean Patent Application No. 10-2018-0120093, filed on Oct. 8, 2018 in the Korean Intellectual Property Office, the disclosure of which is incorporated herein by reference.

BACKGROUND

1. Field

The present embodiments relate to a warning device for a vehicle and a method for controlling the same, and more particularly to large vehicle approach warning device and a method for controlling the same for enabling a driver to recognize the presence of a large vehicle approaching the host vehicle at high speed in the rear side.

2. Description of the Related Art

When a large vehicle such as a container vehicle, a dump truck, or a bus, etc. overtakes a host vehicle at a high speed on an automobile road or an urban expressway, etc., a cross wind generated by the large vehicle passing by the host vehicle causes the vehicle to shake or sway momentarily, resulting in poor behavior.

When the driver grips the steering wheel, the driver can cope with a poor behavior of the vehicle due to the cross wind, but there is a problem that the driving stability of the vehicle is deteriorated because the driver cannot immediately deal with the situation in which the driver is not gripping the steering wheel.

SUMMARY

It is an object of the present embodiments to provide a large vehicle approach warning device and a method for controlling the same for enabling a driver to recognize the presence of a large vehicle approaching the host vehicle at high speed in the rear side.

It is an object of the present embodiments to provide a large vehicle approach warning device and a method for controlling the same for enabling the driver to cope with the instability of the vehicle due to a cross wind generated by a large vehicle approaching a host vehicle, by outputting an warning message when the driver is not gripping the steering wheel in a situation where the vehicle is approaching the host vehicle at a high speed in the rear side.

The present embodiments is to provide a large vehicle approach warning device, comprising: an image sensing unit configured to include an image sensor to be disposed on the vehicle so as to have a view to the outside of the vehicle and capture image data and a processor for processing image data captured by the image sensor, and configured to obtain an image of the rear side of host vehicle; a speed/distance detection unit configured to include a non-image sensor disposed on the host vehicle so as to have a sensing area for the outside of the host vehicle and capture a sensing data, and composed of at least one of a radar sensor, a lidar sensor, and an ultrasonic sensor, and at least one processor for processing the sensing data captured by the non-image sensor, and configured to recognize the counter vehicle of the rear side of the host vehicle and to detect the relative speed and relative distance of the recognized counter vehicle; a steering wheel gripping torque detection unit configured to detect a steering wheel gripping torque of the host vehicle; a controller configured to control the output of a warning based on the approach of the large vehicle, based at least in part on the processing of the image data and the sensing data; and a warning output unit configured to output a warning message according to the control of the controller, wherein the controller determines the approach of the large vehicle based on the image obtained by the image sensing unit and the relative speed and the relative distance detected by the speed/distance detection unit, determines whether a driver is gripping the steering wheel based on the steering wheel gripping torque detected by the steering wheel gripping torque detection unit, and controls the output of the warning message according to the determination result.

The present embodiments is to provide a large vehicle approach warning device, comprising: an image sensing unit configured to include an image sensor to be disposed on a host vehicle so as to have a view to the outside of the host vehicle and capture an image data; a speed/distance detection unit configured to include a non-image sensor to be disposed on the host vehicle so as to have a sensing area for the outside of the host vehicle and capture a sensing data; a steering wheel gripping torque detection unit configured to detect a steering wheel gripping torque of the host vehicle; a domain control unit configured to obtain an image of the rear side of the host vehicle, recognize a counter vehicle of the rear side of the host vehicle, detect a relative speed and a relative distance of the recognized counter vehicle and control at least one driver assistance system provided in the host vehicle, based at least in part on the processing of the image data and the sensing data; and a warning output unit configured to output a warning message according to the control of the domain control unit, wherein the domain control unit determines the approach of the large vehicle based on the obtained image, the detected relative speed and relative distance, determines whether the driver is gripping the steering wheel based on the detected steering wheel gripping torque, and controls the output of the warning message according to the determination result.

The present invention is to provide an image sensor configured to be disposed on the vehicle so as to have a view to the outside of the vehicle and capture image data, wherein the image data is processed by a processor and used to obtain an image of the rear side of the host vehicle, and used to determine the approach of a large vehicle together with the detected relative speed and relative distance, wherein a approach information of the large vehicle is used to control the output of the warning message together with the steering wheel gripping information of the driver determined based on the detected steering wheel gripping torque.

The present invention is to provide a large vehicle approach warning method comprising: obtaining an image of the rear side of a host vehicle; sensing a counter vehicle of the rear side of the host vehicle and obtaining a relative speed and a relative distance of the detected counter vehicle; determining whether the counter vehicle is a large vehicle based on the obtained image, determining whether the counter vehicle is approaching the host vehicle based on the obtained relative speed and relative distance; obtaining steering wheel gripping torque of the host vehicle, determining whether the driver is gripping the steering wheel based on the obtained steering wheel gripping torque; and outputting a warning message if the counter vehicle is a large vehicle and is approaching the host vehicle and the driver is not gripping the steering wheel.

According to the present invention, there is an effect that allows the driver to cope with the instability of the vehicle due to the cross wind generated by the large vehicle approaching the host vehicle at high speed, by outputting a warning message so that the driver grips the steering wheel when the driver is not gripping the steering wheel if the large vehicle is approaching the vehicle at a high speed in the rear side of the vehicle.

In addition, according to the present invention, there is an effect that can reduce the number of unnecessary warnings to prevent the problem of disturbing the driver by frequent warnings, by not outputting a separate warning message to the driver if the vehicle approaching the host vehicle from the rear side is a small vehicle or the driver grips the steering wheel.

BRIEF DESCRIPTION OF THE DRAWINGS

These and/or other aspects of the invention will become apparent and more readily appreciated from the following description of the embodiments, taken in conjunction with the accompanying drawings of which:

FIG. 1 is a view illustrating a driving state of a vehicle equipped with a large vehicle approach warning device according to an embodiment;

FIG. 2 a block diagram illustrating a large vehicle approach warning device according to an embodiment;

FIG. 3 is a block diagram illustrating the controller of FIG. 2;

FIG. 4 is a flowchart illustrating a large vehicle approach warning method according to an embodiment; and FIGS. 5 to 8 are a schematic diagram showing the operation of a large vehicle approach warning device according to an embodiment.

DETAILED DESCRIPTION

Hereinafter, embodiments of the present disclosure will be described in detail with reference to the accompanying drawings. In designating elements of the drawings by reference numerals, the same elements will be designated by the same reference numerals although they are shown in different drawings. Also, the singular forms used in the specification and claims are to be interpreted as generally meaning "one or more" unless stated otherwise. Further, in the following description of the present disclosure, a detailed description of known functions and configurations incorporated herein will be omitted when it may make the subject matter of the present disclosure rather unclear.

Prior to the description with reference to the drawings, terms used in the following description are defined as follows.

The host vehicle is a vehicle equipped with a large vehicle approach warning device according to the embodiments. The counter vehicle is a vehicle traveling in the rear side area of the host vehicle.

The rear side area refers to the rear side area of the host vehicle and includes a left rear side area and a right rear side area.

The approach warning area refers to area where a large vehicle approaches warning device mounted on the host vehicle is substantially applied, and is included in the rear side area of the host vehicle.

The relative distance of the counter vehicle refers to the distance between the host vehicle and the counter vehicle, and the relative speed of the counter vehicle refers to the speed of the counter vehicle based on the speed of the host vehicle.

FIG. 1 is a view illustrating a driving state of a vehicle equipped with a large vehicle approach warning device according to an embodiment and FIG. 2 a block diagram illustrating a large vehicle approach warning device according to an embodiment;

Referring to FIG. 1, the counter vehicle 30 is traveling in the approach warning area of the host vehicle 20 equipped with a large vehicle approach warning device 10.

As described above, the approach warning area is an area to which the large vehicle approach warning device 10 installed in the host vehicle 20 is applied, and is located on the left rear side and the right rear side of the host vehicle 20. FIG. 1 shows the case where the counter vehicle 30 is traveling in the approach warning area on the right rear side of the host vehicle 20.

Referring to FIGS. 1 and 2, the large vehicle approach warning device 10 according to an embodiment is for allowing a driver to recognize a large vehicle approaching the host vehicle 20 from the rear side and is configured to include an image sensing unit 100, an distance/speed detection unit 200, the steering wheel gripping torque detection unit 300, the controller 400, and the warning output unit 500.

The image sensing unit 100 may obtain an image of the rear side using at least one or more cameras mounted on the rear or side of the vehicle. The image sensing unit 100 may transmit the image obtained in response to the request of the controller 400 to the controller 400.

The image sensing unit 100 may include an image sensor configured to be disposed on the vehicle so as to have a view to the outside of the vehicle and capture image data, and a processor configured to process image data captured by the image sensor. At least one image sensor may be mounted to each part of the vehicle so as to a view of the front, side or rear of the vehicle. According to an example, the image sensor and the processor may be implemented as one camera sensor.

Since image information captured by the image sensor is composed of image data, it may mean image data captured from the image sensor. Hereinafter, in the present disclosure, the image information captured by the image sensor refers to image data captured by the image sensor.

The Image data captured by the image sensor may be generated, for example, in one of AVI in raw form, MPEG-4, H.264, DivX, and JPEG formats. Image data captured by the image sensor may be processed by the processor.

In addition, the image sensor may be configured to be disposed in the vehicle so as to have a view to the outside of the host vehicle and capture image data. The image data captured by the image sensor is processed by a processor and used to obtain an image of the rear side of the host vehicle, and used to determine the approach of a large vehicle together with the detected relative speed and relative distance, and the approach information of the large vehicle may be used to control the output of the warning message together with the steering wheel gripping information of the driver determined based on the detected steering wheel gripping torque.

The processor may be operable to process image data captured by the image sensor. Processors may be implemented using at least one of an electrical unit capable of processing image data and performing other functions, for example, such as application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and the like.

The distance/speed detection unit 200 may include a non-image sensor to be disposed on the host vehicle so as to have a sensing area with respect to the outside of the host vehicle and capture sensing data, and may composed of at least one of a radar sensor, a lidar sensor, and an ultrasonic sensor; and at least one processor configured to process sensing data captured by the non-image sensor. The distance/speed detection unit 200 may detect the counter vehicle 30 traveling in the rear side of the host vehicle 20 and detect the relative speed and the relative distance of the detected counter vehicle 30.

For this purpose, the distance/speed detection unit 200 may measure the relative speed and the relative distance by using at least one of an ultrasonic sensor, a radar, a camera, a speed measurement sensor, and a GPS mounted on the host vehicle 20, or may estimate the relative speed and the relative distance by performing a predicted compensation algorithm using at least one of an ultrasonic sensor, a radar and a camera, a speed measurement sensor, and a GPS.

A plurality of non-image sensors may be disposed in the vehicle so as to sense the front, side, and rear of the vehicle and capture sensing data. Examples of the plurality of non-image sensors include radar, lidar, and ultrasonic sensors.

The radar sensor or radar system used in the present disclosure may include at least one radar sensor unit, and may include one or more of, for example, a front sensing radar sensor mounted on the front of the vehicle, a rear radar sensor mounted on the rear of the vehicle, and a side direction or side rear sense radar sensors mounted on each side of the vehicle.

Such a radar sensor or a radar system may analyze a transmitted signal and a received signal to process data, and thus may detect information about an object, and may include an electronic or control unit (ECU) or a processor for this purpose. Data transmission or signal communication from the radar sensor to the ECU may use a communication link, such as an appropriate vehicle network bus.

Such a radar sensor include one or more transmitting antennas for transmitting radar signals and one or more receiving antennas for receiving a reflected signal received from the object.

Meanwhile, the radar sensor according to the present embodiment may adopt a signal transmission/reception scheme of a multi-dimensional antenna array and multiple input multiple outputs to form a virtual antenna aperture larger than an actual antenna aperture.

For example, two-dimensional antenna arrays are used to achieve horizontal and vertical angle precision and resolution.

With a two-dimensional radar antenna array, signals are transmitted and received separately by two scans (time multiplexed) horizontally and vertically, and MIMO can be used separately from two-dimensional radar horizontal and vertical scans (time multiplexed).

More specifically, the radar sensor according to the present embodiment may be adopted a two-dimensional antenna array configuration including a transmitting antenna unit including a total of 12 transmitting antennas (Tx) and a receiving antenna unit including 16 receiving antennas (Rx), and as a result, may have a total of 192 virtual receiving antenna arrangements.

In this case, the transmitting antenna unit includes three transmitting antenna groups including four transmitting antennas, wherein the first transmitting antenna group may be spaced apart from the second transmitting antenna group a predetermined distance in a vertical direction, and the first or second transmitting antenna group may be spaced apart from the third transmitting antenna group by a predetermined distance (D) in a horizontal direction.

In addition, the receiving antenna unit may include four receiving antenna groups including four receiving antennas, each receiving antenna group is arranged to be spaced apart in the vertical direction, the receiving antenna unit may be disposed between the first transmitting antenna group and the third transmitting antenna group spaced in the horizontal direction.

Further, in another embodiment, the antennas of the radar sensor are arranged in a two-dimensional antenna array, for example, each antenna patch can have a Rhombus lattice arrangement to reduce unnecessary side lobes.

Alternatively, the two-dimensional antenna array may include a V-shape antenna array in which a plurality of radiating patches are arranged in a V-shape, and more specifically, may include two V-shape antenna arrays. At this time, a single feed is made to the Apex of each V-shaped antenna array.

Otherwise, the two-dimensional antenna array may include an X-shape antenna array in which a plurality of radiation patches are arranged in an X shape, and more specifically, may include two X-shaped antenna arrays. At this time, a single feed is made to the center of each X-shaped antenna array.

In addition, the radar sensor according to the present embodiment may use a MIMO antenna system in order to implement sensing accuracy or resolution in the vertical and horizontal directions.

More specifically, in the MIMO system, each transmitting antenna may transmit a signal having independent waveforms that are distinct from each other. That is, each transmitting antenna transmits an independent waveform signal that is distinct from other transmitting antennas, and each receiving antenna can determine from which transmitting antenna the reflected signal reflected from the object due to the different waveforms of these signals.

In addition, the radar sensor according to the present embodiment may be configured to include a radar housing for receiving a substrate and a circuit including a transmitting and receiving antenna, and a radome constituting the appearance of the radar housing. At this time, the radome is made of a material that can reduce the attenuation of the radar signal transmitted and received, and the radome may consist of the front and rear bumpers, grilles, or lateral body of the vehicle or the exterior surfaces of the vehicle components.

That is, the radome of the radar sensor may be disposed inside the vehicle grille, the bumper, the vehicle body, or the like, and is disposed as a part of the parts constituting the exterior surface of the vehicle such as the vehicle grille, the bumper, the vehicle body part, thereby providing a convenience of mounting the radar sensor while improving the vehicle aesthetics The lidar may include a laser transmitter, a receiver, and a processor. The lidar may be implemented in a time of flight (TOF) method or a phase-shift method.

The lidar of the TOF system emits a laser pulse signal and receives a reflected pulse signal reflected by the object. The lidar may measure the distance to the object based on the time when the laser pulse signal is emitted and the reflected pulse signal is received. In addition, the relative speed with the object can be measured based on the change in distance over time.

The lidar of the phase-shift method may emit a laser beam that is continuously modulated at a specific frequency, and may measure time and distance from the object based on the amount of phase change of the signal reflected back to the object.

The lidar may detect the object based on the transmitted laser, and detect the distance and relative speed with the detected object. If the object is a stationary object (for example, a street tree, a street light, a traffic light, a traffic sign, etc.), the lidar may detect the traveling speed of the vehicle based on a time of flight (TOF) by the object.

The ultrasonic sensor may include an ultrasonic transmitter, a receiver, and a processor.

The ultrasonic sensor may detect an object based on the transmitted ultrasonic waves, and detect a distance and a relative speed with the detected object. If the object is a stationary object (for example, a street tree, a street light, a traffic light, a traffic sign, etc.), the ultrasonic sensor may detect the traveling speed of the vehicle based on a time of flight (TOF) by the object.

The distance/speed detection unit 200 may transmit the relative speed and the relative distance detected in response to the request of the controller 400 to the controller 400.

The steering wheel gripping torque detection unit 300 detects a torque (hereinafter, referred to as "steering wheel gripping torque") generated as the driver grips and rotates the steering wheel.

The steering wheel gripping torque detection unit 300 may be configured as a torque sensor configured to be attached to a connector for mechanically connecting the steering wheel and the steering shaft and to measure torque. The steering wheel gripping torque detection unit 300 may transmit the steering wheel gripping torque detected in response to the request of the controller 400 to the controller 400.

The controller 400 may control the overall operation of the large vehicle approach warning device 10. According to one example, the controller may be implemented as an electronic control unit (ECU). The controller may receive a processing result of the image data from the processor. The controller may be configured to control the output of the warning based on the approach of the large vehicle based at least in part on the processing of the image data.

The controller 400 is connected to the image sensing unit 100, the distance/speed detection unit 200, the steering wheel gripping torque detection unit 300, and the warning output unit 500 through internal communication of the vehicle, for example, CAN communication, thereby receiving and processing information from the image sensing unit 100, the distance/speed detection unit 200, and the steering wheel gripping torque detection unit 300, and controlling the warning output unit 500 according to the processed result.

Although one embodiment discloses the use of CAN communication, but are not limited to, and may use at least one of the vehicle's internal communications, e.g. LIN or Flexray communication.

In detail, the controller 400 may determine whether the counter vehicle 30 is in the approach warning area, the counter vehicle 30 is approaching the host vehicle 20, the counter vehicle 30 is a large vehicle, and the driver grips the steering wheel based on an image received from the image sensing unit 100, a relative speed and relative distance of the counter vehicle 30 received from the distance/speed detection unit 200, and a steering wheel gripping torque received from the steering wheel gripping torque detection unit 300, and may control the warning output unit 500 to output a warning message based on the determination result.

The warning output unit 500 may output a warning message in various ways visually, audibly, and tactilely. The warning output unit 500 may output a warning message through, for example, warning lamp lighting, warning sound, steering wheel vibration, or the like.

FIG. 3 is a block diagram illustrating the controller of FIG. 2.

Referring to FIG. 3, the controller 400 of the large vehicle approach warning device according to an embodiment may include an area determination unit 410, a vehicle size determination unit 420, a vehicle approach determination unit 430, a steering gripping determination unit 440, and a warning control unit 450.

The area determination unit 410 may determine whether the counter vehicle is in the approach warning area based on an image received from the image sensing unit 100 and the relative distance of the counter vehicle received from the distance/speed detection unit 200.

When the area determination unit 410 determines that the counter vehicle is in the approach warning area, the vehicle size determination unit 420 may determine whether the counter vehicle is a large vehicle or a small vehicle by analyzing an image received from the image sensing unit 100. Large vehicles may be container vehicles, dump trucks, buses, etc., and small vehicles may be passenger cars.

The reason for classifying the vehicle into a small vehicle and a large vehicle is that when the counter vehicle is a small vehicle, the magnitude of the cross wind generated by the counter vehicle is small, and thus the effect on the behavior of the host vehicle is insignificant, but this is to reduce the frequency of the occurrence of a warning since the warning may be disturbed to the driver due to the frequent warning when the warning is generated regardless of the size of the counter vehicle.

When the vehicle size determination unit 320 determines that the counter vehicle in the approach warning area is a large vehicle, the vehicle approach determination unit 430 may determine whether the rear side counter vehicle is approaching the host vehicle based on the relative speed and the relative distance of the counter vehicle received from the distance/speed detection unit 200.

When the vehicle approach determination unit 430 determines that the counter vehicle in the approach warning area is approaching the host vehicle, the steering wheel gripping determination unit 440 may request the steering wheel gripping torque measurement from the steering wheel gripping torque detection unit 300.

The steering wheel gripping torque detection unit 300 may determine whether the driver is gripping or not gripping the steering wheel of the vehicle based on a steering wheel gripping torque received from the steering wheel gripping torque detection unit 300 in response to the request.

Specifically, the steering wheel gripping determination unit 440 may determine that the driver is not gripping the steering wheel when a steering wheel gripping torque received from the steering wheel gripping torque detection unit 300 is smaller than the predetermined reference criterion torque, and may determine that the driver is gripping the steering wheel when the steering wheel gripping torque received from the steering wheel gripping torque detection unit 300 is equal to or greater than the reference criterion torque.

When the steering wheel gripping determination unit 440 determines that the steering wheel is not gripping, the warning control unit 450 may control the warning output unit 500 to output a warning message.

The large vehicle approach warning device 10 according to the present disclosure may include an image sensing unit configured to include an image sensor to be disposed on the vehicle so as to have a view to the outside of the vehicle and capture image data; a speed/distance detection unit configured to include a non-image sensor to be disposed on the host vehicle so as to have a sensing area for the outside of the host vehicle and capture sensing data; a steering wheel gripping torque detection unit for detecting a steering wheel gripping torque of the host vehicle; a domain control unit (DCU) configured to acquire an image of the rear side of the host vehicle, to recognize the counter vehicle of the rear side of the host vehicle, to detect the recognized relative speed and relative distance of the counter vehicle, and to control at least one driver assistance system provided in the host vehicle, based on at least in part on the processing of the image data and the sensing data; and a warning output unit configured to output a warning message according to the control of the domain control unit.

According to an example, the processor for processing the above-described image data, and the controller of various devices provided in the controller and the vehicle may be integrated into one and implemented as a domain control unit. In this case, the domain control unit may generate various vehicle control signals, thereby controlling the driver assistance system provided in the vehicle and various devices of the vehicle associated therewith.

The domain control unit may determine the approach of the large vehicle based on the acquired image, the detected relative speed and the relative distance, determine whether the driver is gripping the steering wheel and control the output of a warning message according to the determination result. The domain control unit may include at least one processor for this processing.

The domain control unit is provided in the vehicle and can communicate with at least one image sensor and at least one non-image sensor mounted in the vehicle. To this end, a suitable data link or communication link may be further included, such as a vehicle network bus for data transmission or signal communication.

The domain control unit may be operable to control one or more of the various driver assistance systems (DAS) used in the vehicle.

The domain control unit may control a driver assistance system (DAS) such as blind spot detection (BSD) system, adaptive cruise control (ACC) system, lane departure warning system (LDWS), lane keeping assistance system (LKAS), lane change assistance system (LCAS), etc. based on sensing data captured by a plurality of non-image sensors and image data captured from the image sensor.

The distance/speed detection unit 200 may transmit the relative speed and the relative distance detected in response to the request of the domain control unit to the domain control unit.

The steering wheel gripping torque detection unit 300 detects a torque (hereinafter, referred to as "steering wheel gripping torque") generated as the driver grips and rotates the steering wheel. The steering wheel gripping torque detection unit 300 may be configured as a torque sensor configured to be attached to a connector for mechanically connecting the steering wheel and the steering shaft and to measure torque. The steering wheel gripping torque detection unit 300 may transmit the steering wheel gripping torque detected in response to the request of the domain control unit to the domain control unit.

The domain control unit is connected to the image sensing unit 100, the distance/speed detection unit 200, the steering wheel gripping torque detection unit 300, and the warning output unit 500 through internal communication of the vehicle, for example, CAN communication, thereby receiving and processing information from the image sensing unit 100, the distance/speed detection unit 200, and the steering wheel gripping torque detection unit 300, and controlling the warning output unit 500 according to the processed result.

Although one embodiment discloses the use of CAN communication, but are not limited to, and may use at least one of the vehicle's internal communications, e.g. LIN or Flexray communication.

In detail, the domain control unit may determine whether the counter vehicle 30 is in the approach warning area, the counter vehicle 30 is approaching the host vehicle 20, the counter vehicle 30 is a large vehicle, and the driver grips the steering wheel based on an image received from the image sensing unit 100, a relative speed and relative distance of the counter vehicle 30 received from the distance/speed detection unit 200, and a steering wheel gripping torque received from the steering wheel gripping torque detection unit 300, and may control the warning output unit 500 to output a warning message based on the determination result.

The warning output unit 500 may output a warning message in various ways visually, audibly, and tactilely. The warning output unit 500 may output a warning message through, for example, warning lamp lighting, warning sound, steering wheel vibration, or the like.

The domain control unit may determine whether the counter vehicle is in the approach warning area, based on an image received from the image sensing unit 100 and the relative distance of the counter vehicle received from the distance/speed detection unit 200.

When the counter vehicle is in the approach warning area, the domain control unit may determine whether the counter vehicle is a large vehicle or a small vehicle by analyzing an image received from the image sensing unit 100. Large vehicles may be container vehicles, dump trucks, buses, etc., and small vehicles may be passenger cars.

The reason for classifying the vehicle into a small vehicle and a large vehicle is that when the counter vehicle is a small vehicle, the magnitude of the cross wind generated by the counter vehicle is small, and thus the effect on the behavior of the host vehicle is insignificant, but this is to reduce the frequency of the occurrence of a warning since the warning may be disturbed to the driver due to the frequent warning when the warning is generated regardless of the size of the counter vehicle.

When the vehicle size determination unit 320 determines that the counter vehicle in the approach warning area is a large vehicle, the domain control unit may determine whether the rear side counter vehicle is approaching the host vehicle based on the relative speed and the relative distance of the counter vehicle received from the distance/speed detection unit 200.

When the vehicle approach determination unit 430 determines that the counter vehicle in the approach warning area is approaching the host vehicle, the domain control unit may request the steering wheel gripping torque measurement from the steering wheel gripping torque detection unit 300.

The steering wheel gripping torque detection unit 300 may determine whether the driver is gripping or not gripping the steering wheel of the vehicle based on a steering wheel gripping torque received from the steering wheel gripping torque detection unit 300 in response to the request.

Specifically, the domain control unit may determine that the driver is not gripping the steering wheel when a steering wheel gripping torque received from the steering wheel gripping torque detection unit 300 is smaller than the predetermined reference criterion torque, and may determine that the driver is gripping the steering wheel when the steering wheel gripping torque received from the steering wheel gripping torque detection unit 300 is equal to or greater than the reference criterion torque.

When the steering wheel gripping determination unit 440 determines that the steering wheel is not gripping, the domain control unit may control the warning output unit 500 to output a warning message.

Hereinafter, a large vehicle approach warning method using the aforementioned large vehicle approach warning device will be described with reference to FIG. 4. Hereinafter, the description will be based on the controller, but is not limited thereto. The following description of the operation of the controller can be performed substantially the same in the domain control unit except for the content that is not applicable.

FIG. 4 is a flowchart illustrating a large vehicle approach warning method according to an embodiment.

Referring to FIG. 4, the large vehicle approach warning method according to an embodiment may include steps 610 to 680.

In step 610, the image sensing unit 100 may acquire an image of the rear side through a camera mounted on the rear or/and side of the vehicle. In addition, the image sensing unit 100 may transmit the image acquired in response to the request of the controller 400 to the controller 400.

In step 620, the distance/speed detection unit 200 may detect the counter vehicle of the rear side of the host vehicle and detect the relative speed and relative distance of the detected counter vehicle. In addition, the distance/speed detection unit 200 may transmit the relative speed and the relative distance of the counter vehicle detected in response to the request of the controller 400 to the controller 400.

In step 630, the area determination unit 410 of the controller 400 may determine whether the counter vehicle is in the approach warning area. In detail, the area determination unit 410 may determine whether there is a counter vehicle in the approach warning area based on the image received from the image sensing unit 100 and the relative distance of the counter vehicle received from the distance/speed detection unit 200.

In step 630, If it is determined that there is a counter vehicle in the approach warning area, the process proceeds to step 640, and If it is determined that there is no counter vehicle in the approach warning area, the process returns to step 610.

In step 640, the vehicle size determination unit 420 may analyze the image received from the image sensing unit 100 to determine whether the counter vehicle in the approach warning area is a large vehicle or a small vehicle.

In step 640, if it is determined that the counter vehicle is a large vehicle, the process proceeds to step 650, and if it is determined that the counter vehicle is a small vehicle, the process returns to step 610.

In step 650, the vehicle approach determination unit 430 of the controller 400 may determine whether the counter vehicle is approaching the host vehicle based on the relative speed and the relative distance of the counter vehicle received from the distance/speed detection unit 200. In step 650, when it is determined that the counter vehicle is approaching the host vehicle, the controller 400 may request steering wheel gripping torque detection from the steering wheel gripping torque detection unit 300. On the other hand, in step 650, if it is determined that the counter vehicle is not approaching the host vehicle, the process returns to step 610.

In step 660, the steering wheel gripping torque detection unit 300 may detect the steering wheel gripping torque in response to the request of the controller 400 and transmit the detected steering wheel gripping torque to the controller 400.

In step 670, the steering wheel gripping determination unit 440 of the controller 400 may receive the steering wheel gripping torque from the steering wheel gripping torque detection unit 300, and determine whether the driver is gripping the steering wheel based on the received steering wheel gripping torque. At this time, the steering wheel gripping determination unit 440 may determine that the driver is not gripping the steering wheel when a steering wheel gripping torque received from the steering wheel gripping torque detection unit 300 is smaller than the predetermined reference criterion torque, and may determine that the driver is gripping the steering wheel when the steering wheel gripping torque received from the steering wheel gripping torque detection unit 300 is equal to or greater than the reference criterion torque.

In step 670, If it is determined that the driver is not gripping the steering wheel, the process proceeds to step 680 to operate the warning output unit 500, and if it is determined that the driver is gripping the steering wheel, the process returns to step 610.

FIGS. 5 to 8 are a schematic diagram showing the operation of a large vehicle approach warning device according to an embodiment.

Referring to FIG. 5, when the counter vehicle 30 within the approach warning area is a small vehicle, the warning output unit 500 is not operated regardless of whether the counter vehicle 30 is approaching the host vehicle 20 or whether the driver is not gripping the steering wheel.

This is to prevent driving disturbances caused by frequent warnings because the amount of cross wind is small when the counter vehicle is a small vehicle and thus the influence on the behavior of the host vehicle is insignificant even when the counter vehicle approaches the host vehicle.

Referring to FIG. 6, when the counter vehicle 30 in the approach warning area has a smaller relative speed than the host vehicle 20, the warning output unit 500 is not operated even if the counter vehicle 30 is a large vehicle. When the counter vehicle 30 is smaller relative speed than the host vehicle 20, the counter vehicle 30 does not approach the host vehicle 20, so that there is no need to generate a warning.

Referring to FIG. 7, when the driver is gripping the steering wheel 600, the warning output unit 500 is not operated even when the counter vehicle 30 in the approach warning area is a large vehicle and is approaching the host vehicle 20. When the driver is gripping the steering wheel 600, the driver is prepared to cope with a poor behavior of the host vehicle 20 due to the cross wind generated by the counter vehicle 30, so that there is no need to generate a warning.

Referring to FIG. 8, when the driver vehicle is not gripping the steering wheel 600 in a situation where the counter vehicle 30 in the approach warning area is a large vehicle and the relative speed is larger than the host vehicle 20, the warning output unit 500 is operated.

Therefore, since the driver who checks the warning message of the warning output unit 500 may recognize the approach of the large vehicle and grip the steering wheel 600 before the large counter vehicle 30 approaches the host vehicle 20, the driver can cope with a poor behavior of the host vehicle caused by the cross wind generated by the large vehicle.

Using the above embodiments, there is an effect that allows the driver to cope with the instability of the vehicle caused by the cross wind generated by a large vehicle approaching the host vehicle at high speed by outputting a warning message for the driver to hold the steering wheel when the driver is not gripping the steering wheel in a situation where a large vehicle is approaching the host vehicle at a high speed in the rear side of the host vehicle.

According to the embodiments of the present invention, it is possible to reduce the number of unnecessary warnings and to prevent the driver from being disturbed by the frequent warning, by not giving a separate warning to the driver when the vehicle to be overtaken is a small vehicle or the driver is gripping the steering wheel, The description above is merely illustrative of the technical spirit of the present disclosure, and a person of ordinary skill in the art to which the present disclosure pertains may combine the configurations without departing from the essential characteristics of the present disclosure. Various modifications and variations may be made, including separation, substitution, and alteration. Therefore, the embodiments disclosed in the present disclosure are not intended to limit the technical spirit of the present disclosure but to describe the present disclosure, and the scope of the technical spirit of the present disclosure is not limited by these embodiments. In other words, within the scope of the present disclosure, all of the components may be selectively operated in combination with one or more. The protection scope of the present disclosure should be interpreted by the following claims, and all technical ideas within the scope equivalent thereto shall be construed as being included in the scope of the present disclosure.

DESCRIPTION OF SYMBOLS

10: large vehicle approach warning device
20: host vehicle
30: counter vehicle
100: image sensing unit
200: distance/speed detection unit
300: steering wheel gripping torque detection unit
400: controller
500: warning output unit
410: area determination unit
420: vehicle size determination unit
430: vehicle approach determination unit
440: steering grip determination unit
450: warning control unit

What is claimed is:

1. A vehicle approach warning device, comprising:
an image sensor disposed on a host vehicle so as to have a field of view outside the host vehicle, the image sensor configured to acquire image data of a rear view of the host vehicle and recognize a counter vehicle traveling toward a rear side of the host vehicle;
a speed/distance sensor disposed on the host vehicle and comprising at least one of a radar sensor, a lidar sensor or an ultrasonic sensor, the speed/distance sensor configured to:
capture sensing data in a sensing area outside the host vehicle, and
detect a relative speed and a relative distance between the counter vehicle and the host vehicle;
a steering wheel gripping torque sensor configured to detect a steering wheel gripping torque of the host vehicle;
a controller configured to process the image data and control to output a warning message of approach of the counter vehicle, based at least in part on the processed image data and the sensing data,
wherein the controller determines the approach of the counter vehicle based on the image data, the relative speed, and the relative distance, determines whether a driver is gripping the steering wheel based on the steering wheel gripping torque, and controls the warning message according to determination results, and
wherein the controller determines that the counter vehicle is approaching to the host vehicle when the relative distance and the relative speed between the counter vehicle and the host vehicle traveling in the same direction respectively become predetermined values or less, and determines whether the counter vehicle is a large vehicle based on the image data.

2. The vehicle approach warning device of claim 1, wherein the controller is further configured to, when it is determined that the counter vehicle is the large vehicle approaching the host vehicle and the driver is not gripping the steering wheel, control to output the warning message.

3. The vehicle approach warning device of claim 2, wherein, when the steering wheel gripping torque detected from the steering wheel gripping torque sensor is smaller than a predetermined reference criterion torque, the controller determines that the driver is not gripping the steering wheel.

4. The vehicle approach warning device of claim 2, wherein the controller is further configured to determine whether the counter vehicle is in an approach warning area based on the image data, and the relative distance and
when the area determination unit determines that the counter vehicle is within the approach warning area, the controller analyzes the image data of the rear view including an image of the counter vehicle.

5. The vehicle approach warning device of claim 1, wherein the steering wheel gripping torque sensor is attached to a connector for mechanically connecting the steering wheel and a steering shaft and is configured to measure torque.

6. The vehicle approach warning device of claim 1, wherein the controller controls the output of the warning message in the form of at least one of warning light lighting, warning sound, or steering wheel vibration.

7. The vehicle approach warning device of claim 6, wherein the large vehicle includes one of container vehicles, dump trucks, and buses.

8. A vehicle approach warning device, comprising:
an image sensor disposed on a host vehicle so as to have a field of view outside the host vehicle, the image sensor configured to capture image data of a rear view of the host vehicle;
a speed/distance sensor disposed on the host vehicle and configured to capture sensing data in a sensing area outside the host vehicle;
a steering wheel gripping torque sensor configured to detect a steering wheel gripping torque of the host vehicle;
a controller configured to:
obtain the image data from the image sensor,
recognize a counter vehicle traveling toward a rear side of the host vehicle, based on the image data, detect a relative speed and a relative distance between the counter vehicle and the host vehicle, control at least one driver assistance system of the host vehicle, based at least in part on the image data and the sensing data, and control to output a warning message, wherein the controller unit determines approach of the counter vehicle based on the image data, the relative speed, and the relative distance, determines whether a driver is gripping the steering wheel based on the steering wheel gripping torque, and controls the warning message according to the determination result, wherein the controller determines that the counter vehicle is approaching to the host vehicle when the relative distance and the relative speed between the counter vehicle and the host vehicle traveling in the same direction respectively become predetermined values or less, and wherein the controller determines whether the counter vehicle is a large vehicle based on the image data.

9. The vehicle approach warning device of claim 8, wherein the controller determines whether the driver of the host vehicle is gripping the steering wheel based on the steering wheel gripping torque, and when the counter vehicle is the large vehicle approaching the host vehicle and the driver is not gripping the steering wheel, controls to output the warning message.

10. The vehicle approach warning device of claim 9, wherein, when a steering wheel gripping torque detected from the steering wheel gripping torque sensor is smaller than the predetermined reference criterion torque, the controller determines that the driver is not gripping the steering wheel.

11. The vehicle approach warning device of claim 9, wherein the controller determines whether the counter vehicle is in an approach warning area, based on the image data and the relative distance and analyzes the image data when it is determined that the counter vehicle is within the approach warning area.

12. The vehicle approach warning device of claim 8, wherein the steering wheel gripping torque sensor is attached to a connector for mechanically connecting the steering wheel and a steering shaft and is configured to measure torque.

13. The vehicle approach warning device of claim 8, wherein the controller output the warning message in the form of at least one of warning light lighting, warning sound, or steering wheel vibration.

14. The vehicle approach warning device of claim 8, wherein the large vehicle includes one of container vehicles, dump trucks, and buses.

15. A vehicle approach warning device, comprising:

image sensor disposed on a host vehicle so as to have a field of view outside the host vehicle and to capture image data; and a processor configured to:

process the image data to acquire an image of a rear side of the host vehicle, acquire approach information of a counter vehicle, based on the image data and a relative speed and a relative distance between the host vehicle and the counter vehicle, and control an output of a warning message, based on the approach information and steering wheel gripping information of a driver determined based on a steering wheel gripping torque, wherein the processor determines that the counter vehicle is approaching to the host vehicle when the relative distance and the relative speed between the counter vehicle and the host vehicle traveling in the same direction respectively become predetermined values or less, and determines whether the counter vehicle is a large vehicle based on the image data.

16. A vehicle approach warning method, comprising:

obtaining an image in a rear view of a host vehicle;

sensing a counter vehicle in the rear view of the host vehicle;

obtaining a relative speed and a relative distance between the counter vehicle and the host vehicle;

determining whether the counter vehicle is a large vehicle based on the obtained image;

determining whether the counter vehicle is approaching the host vehicle based on the obtained relative speed and relative distance;

obtaining a steering wheel griping torque of the host vehicle, determining whether the driver is gripping the steering wheel based on the obtained steering wheel griping torque; and upon determining that the counter vehicle is the large vehicle and is approaching the host vehicle and the driver is not gripping the steering wheel, outputting a warning message, wherein the determining whether the counter vehicle is approaching includes determining that the counter vehicle is approaching to the host vehicle when the relative distance and the relative speed between the counter vehicle and the host vehicle traveling in the same direction respectively become predetermined values or less.

* * * * *